Aug. 26, 1969
R. F. DILL
3,463,061
MEANS AND METHOD FOR INSERTING JOINT FORMING STRUCTURE
Filed July 3, 1967
3 Sheets-Sheet 1
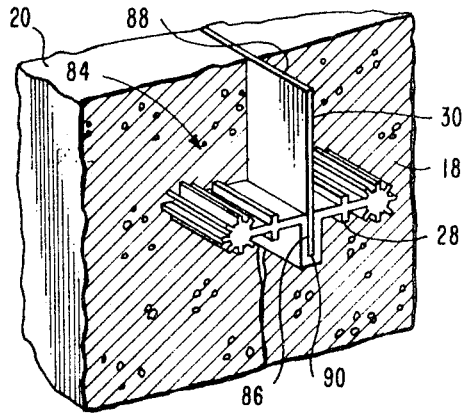
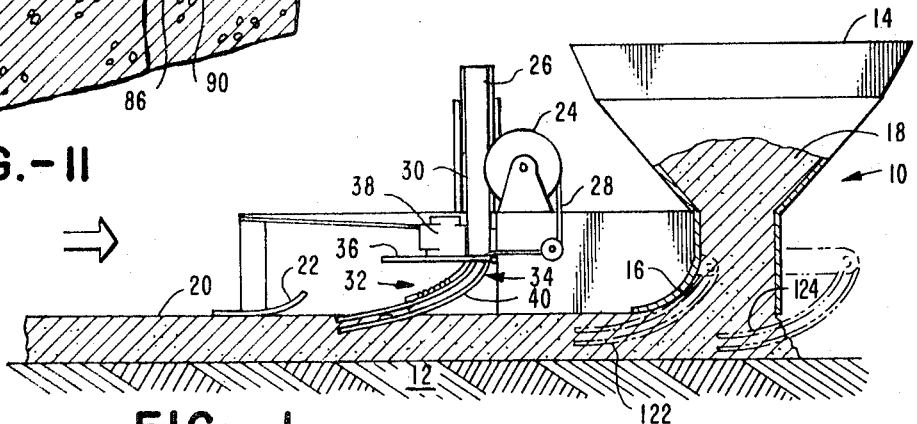
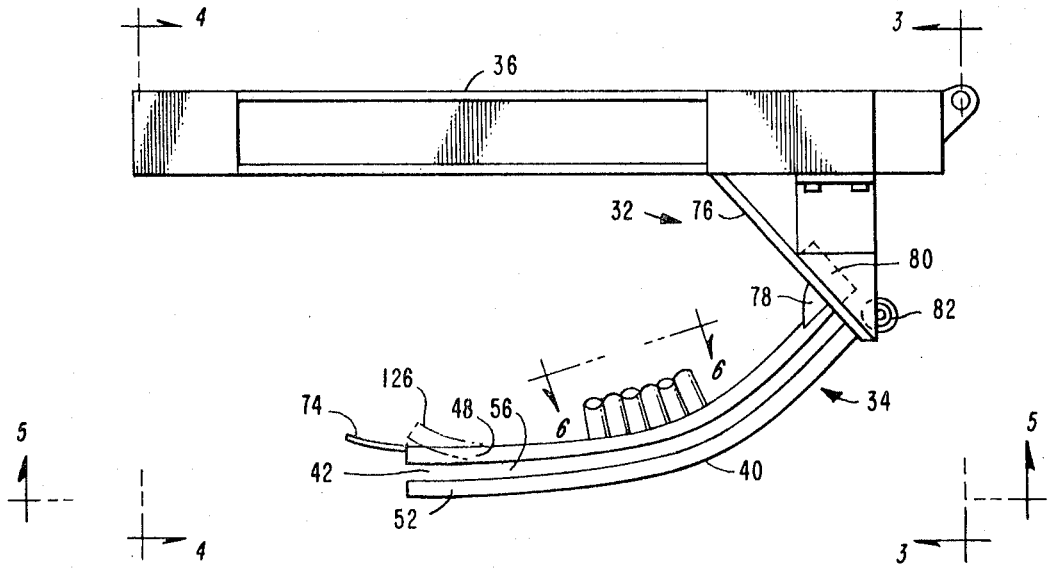
INVENTOR.
ROBERT F. DILL
BY Bruce A Jagger
Bechler & Arant
ATTORNEYS Aug. 26, 1969  R. F. DILL  3,463,061
MEANS AND METHOD FOR INSERTING JOINT
FORMING STRUCTURE
Filed July 3, 1967  3 Sheets-Sheet 2

INVENTOR.
ROBERT F. DILL
BY Bruce A Jagger
Bechler & Arant
ATTORNEYS

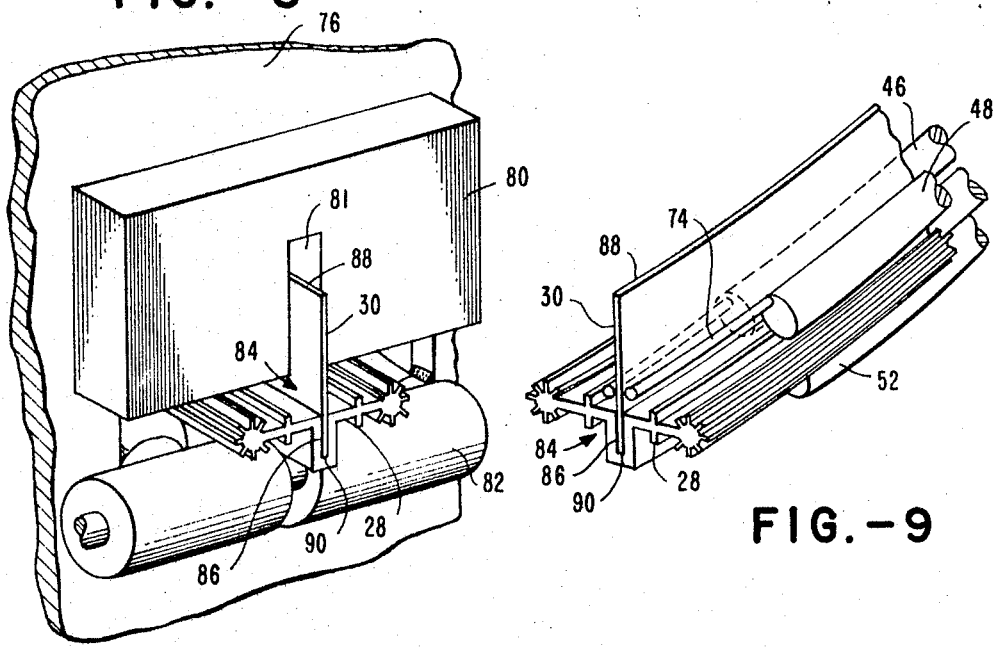
FIG.-8
FIG.-9
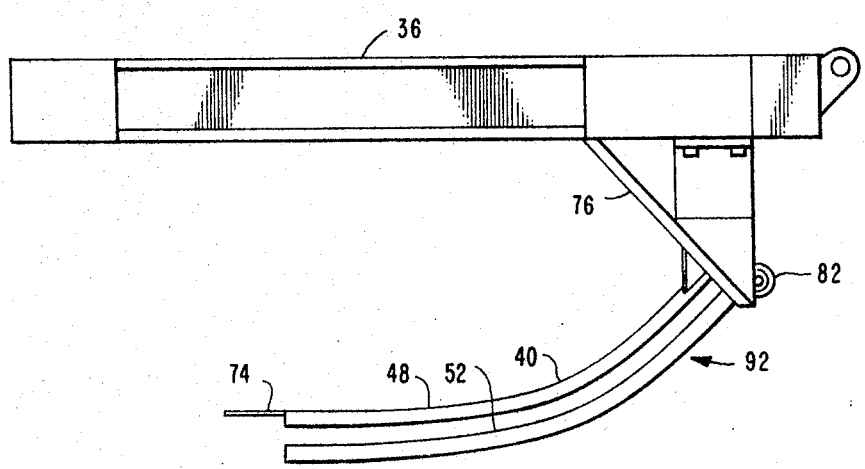
FIG.-10

United States Patent Office 3,463,061
Patented Aug. 26, 1969

3,463,061
MEANS AND METHOD FOR INSERTING JOINT FORMING STRUCTURE
Robert F. Dill, 13341 Illinois, Westminster, Calif. 92683
Filed July 3, 1967, Ser. No. 650,704
Int. Cl. E01c 23/02
U.S. Cl. 94—39     10 Claims

ABSTRACT OF THE DISCLOSURE

A method and device for inserting a flexible joint forming structure beneath the surface of a plastic mass such as uncured concrete. The joint forming structure is inserted in the plastic mass by guiding it through an open sided guide.

---

The apparatus of this invention for inserting a joint forming structure beneath the surface of a plastic mass comprises a guide which is composed of a plurality of elongated guide members which extend parallel to and spaced apart from one another. These elongated guide members define between them an elongated open sided channel. This channel is adapted to slidably receive the joint forming structure. When immersed beneath the surface of a plastic mass, such as uncured concrete, the channel is open to the plastic mass so that the mass flows into any part of the channel which is not occupied by a segment of joint forming structure.

Suitable means are provided for imparting vibration to the guide.

Varied means are provided for supplying flexible joint forming structure to the channel.

In operation at least a portion of the guide is immersed in the plastic mass and the guide is moved through the mass so that the joint forming structure is deposited in the plastic mass at a predetermined location and with a predetermined orientation.

In one embodiment the guide has an arcuate portion in it with two guide members being positioned on the concave side of the arcuate portion. The space between the two members on the concave side of the guide defines one open side of a channel. Suitable means are provided on the open side of the channel between these two guides so that a strip or fin of the flexible joint forming structure which projects through this open side must follow a sinuous path as it travels through the arcuate portion of the guide. The means which define this sinuous path are so adjusted that the path is of the same length as the path followed by the bottom of the fin as it travels through the arcuate portion of the guide closer to the outer or convex side of the guide. This prevents the upper edge of the strip from buckling and folding and being jerked out of the channel or torn by the plastic mass with which it comes in contact as it travels around the arcuate portion of the guide. By forcing the upper edge of the strip to travel the same distance as the lower edge a uniform tension is maintained across the entire width of the strip and random folding is prevented.

When the plastic mass is uncured concrete it is very desirable to have the upper edge of the strip extend in a straight line at or about the surface of the concrete. Folds or unevenness in the upper edge of the strip will generally cause the concrete to spall along the folds and will produce an uneven failure joint with pitted edges.

In a further embodiment of this invention the two uppermost guide members are provided with extensions which trail outwardly and upwardly from them. These extensions serve as strip straightener guides. These strip straightener guides are located adjacent the open side of the channel between the two guide members so that the straightened guides contact a strip as it leaves the guide. The guide is vibrated during use so that these extensions contact and vibrate on either side of the strip so as to set it up vertically in a straight line as it leaves the guide.

Previously various guides have been used for inserting strip and waterstop materials of varying configurations into uncured concrete. In general these previous insertion devices have employed elongated closed tubes which are intended to guide the strip material into its final location beneath the surface of the concrete mass before the material comes in contact with the concrete. Considerable difficulty has been experienced with these tubes because they tend to become jammed or do not accurately position the strip material at the desired location and orientation. Also water and foam out of the uncured concrete tended to collect around and particularly under the strip or waterstop material producing substantial defects in the cured concrete slab.

These and other disadvantages of the prior art have been overcome by the present invention. The open sides of the channel through which the joint forming structure is guided permit the plastic mass to flow and consolidate around the joint forming structure. Consolidation of the plastic mass is facilitated by vibrating the guide. Vibration of the guide also facilitates passage of the joint forming structure through the open sided channel. Because of the open channel sides and the vibration, the guide is self cleaning so that jamming of the joint forming structure in the guide is substantially eliminated.

The joint forming structure inserting device of this invention may be mounted on any suitable piece of equipment such as a slip form or a screeding machine, or a separate machine designed for the single purpose of carrying this device may be used.

In the embodiment illustrated in the drawings:

FIGURE 1 is a schematic partial cross-sectional view of a slip form carrying the device of this invention;

FIGURE 2 is a side elevation of one embodiment of the device of this invention;

FIGURE 8 is a perspective schematic view of the entrance portion of a guide;

FIGURE 9 is a perspective schematic view of the exit portion of a guide;

FIGURE 10 is a side elevation of an additional embodiment of a guide;

FIGURE 11 is a fragmentary cross-sectional view of a plastic mass containing a joint forming structure in situ;

FIGURE 12 is a rear elevation of a further embodiment of the guide of this invention; and FIGURE 13 is an additional embodiment of the guide of this invention.

Figure 3:
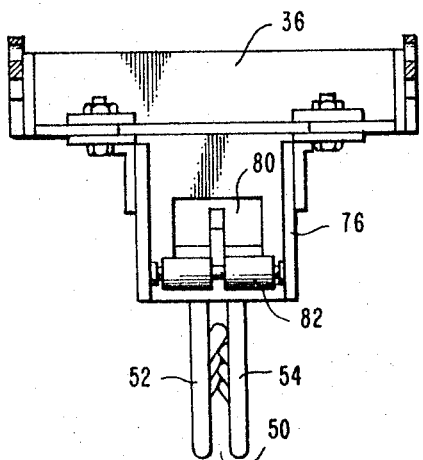
FIGURE 3 is a front elevation taken along line 3—3 in FIGURE 2.
Figure 4:
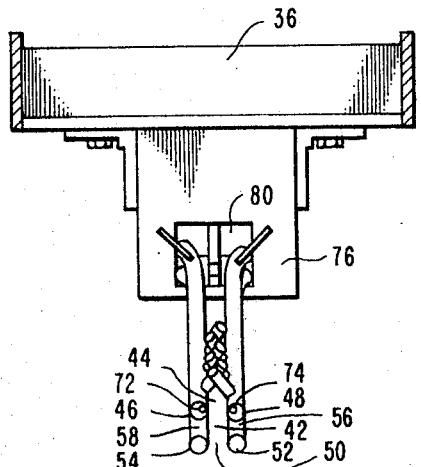
FIGURE 4 is a rear elevation taken along line 4—4 in FIGURE 2.
Figure 5:
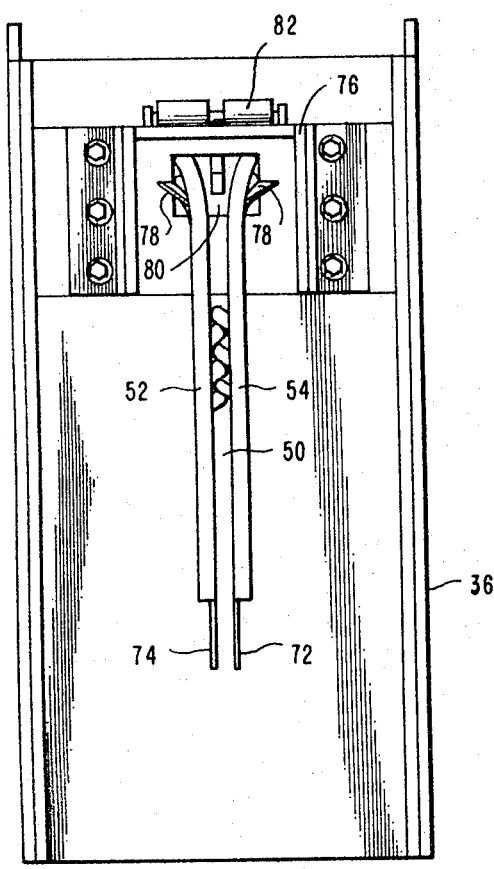
FIGURE 5 is a bottom plan view taken along line 5—5 in FIGURE 2.
Figures 6, 7:
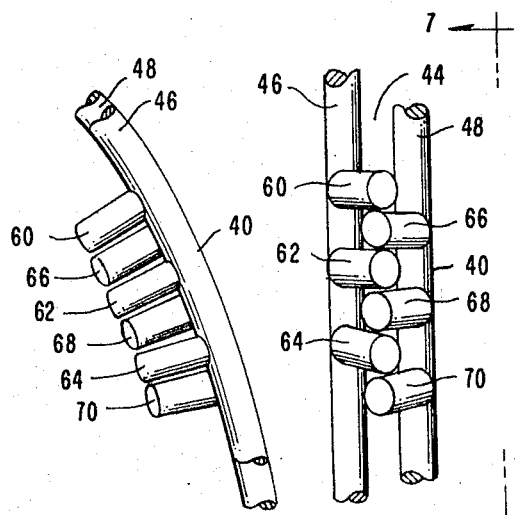
FIGURE 6 is a fragmentary plan view of the arcuate portion of a guide taken along line 6—6 in FIGURE 2.
FIGURE 7 is a partial side elevation of the arcuate portion of a guide taken along line 7—7 in FIGURE 6.

Referring particularly to the drawings there is illustrated a slip form indicated generally at 10 which rides a predetermined distance above a base 12. Slip form or concrete slab laying machine 10 is provided with hopper 14 and troweling pan 16. Uncured concrete 18 is poured into hopper 14 and descends to rest on base 12. This fresh concrete is smoothed by troweling pan 16 so as to produce a uniform upper surface 20 on the uncured concrete mass. A press plate 22 is trailed behind slip form 10 as it moves in the direction of the arrow depositing uncured concrete in the form of a slab having a uniform upper surface 20. A seal reel 24 and a fracturing strip reel 26 are positioned on slip form 10 so as to feed seal 28 and fracturing strip 30 to a joint forming structure inserting device indicated generally at 32. Inserting device 32 includes a guide indicated generally at 34, an arm 36, and vibrating means 38. As particularly illustrated in FIGURES 2 through 10 guide 34 is provided with an arcuate portion 40. As illustrated particularly in FIGURES 4, 6 and 7 guide 34 defines an open sided channel 42 which has a first open side 44 on the concave side of guide 34. First and second guide members 46 and 48, respectively, are positioned on either side of first open side 44. A second open side 50 is positioned on the convex side of guide 34. Second open side 50 is defined by the space between third and fourth guide members 52 and 54, respectively. Third open side 56 of open sided channel 42 is defined between second and third guide members 48 and 52, respectively. A fourth open side 58 to open sided channel 42 is defined between fourth and first guide members 54 and 46, respectively. With particular reference to FIGURES 6 and 7 fingers 60, 62 and 64 are provided on the concave side of first guide member 46. Fingers 60, 62 and 64 extend upwardly and generally transversely to the longitudinal axes of first guide member 46. Fingers 60, 62 and 64 are inclined over first open side 44. A second group of fingers 66, 68 and 70 is provided on the concave side of second guide member 48. Fingers 66, 68, and 70 project upwardly from second guide member 48 and generally transversely to the longitudinal axes of second guide member 48. Fingers 66, 68 and 70 are inclined over first open side 44. Fingers 60 and 62 are so spaced that finger 66 passes therebetween without contacting either finger 60 or finger 62. Likewise fingers 66 and 68 are so spaced that finger 62 passes therebetween without contacting either finger 66 or finger 68. The fingers on first and second guide members 46 and 48, respectively, are so spaced and interlaced so that a sinuous open path is defined by the fingers over first open side 44 throughout arcuate portion 40. Strip straightener guides 72 and 74, respectively, are located on either side of first open side 44. Guides 72 and 74 extend beyond and upwardly from side 44 so as to contact the upper sides of a fracturing strip after it leaves side 44. Strip straightener guides 72 and 74 serve to contact and vertically align a fracturing strip as it leaves guide 34. Guide members 46, 48, 52 and 54, respectively, are rigidly affixed at their forward end to support plate 76. Support plate 76 is affixed to arm 36. Arm 36 is pivotally mounted so as to facilitate imparting vibration to guide 34. Guide members 46, 48, 52, and 54 extend unsupported and independently of one another from support plate 76. The independent mounting of each guide member allows each guide member to vibrate independently of the other guide members and allows a small amount of flexibility in the dimensions of open sided channel 42. This greatly enhances the self cleaning properties of guide 34. The vibration of guide members 46, 48, 52 and 54 attracts moisture and small particles of sand and cement to fill any voids around the insert. Braces 78 extend from first and second guide members 46 and 48, respectively, to plate 76. With particular reference to FIGURE 8, guide block 80 is composed of a rigid smooth self lubricating material such as nylon or Teflon which is provided with a slot 81. Slot 81 is adapted to receive and guide fracturing strip 30 into guide 34. Notched guide roller 82 is adapted to receive and guide seal 28 into guide 34. When combined fracturing strip 30 and seal 28 form a joint forming structure indicated generally at 84, joint forming structure 84 enters the forward end of guide 34 as a single unit and is carried through open sided channel 42 into its predetermined location and orientation beneath the surface of concrete 18 as a single unit. Elongated, supple seal 28 is provided with a groove 86 which opens upwardly between the edges of seal 28. Elongated supple fracturing strip 30 is provided with an upper edge 88 and a lower edge 90. Lower edge 90 is positioned in groove 86.

Referring particularly to FIGURE 10 there is illustrated a guide 92 which does not include means for defining a sinuous path over arcuate portion 40. Guide 92 is particularly adapted for use with a joint forming structure wherein the fracturing strip is inseparable from the seal.

Referring particularly to FIGURE 12 there is illustrated a three member guide 94 in which a T shaped joint forming structure 96 is positioned in operative relationship with guide members 98, 100 and 102, respectively. Guide members 98, 100 and 102 define therebetween a generally triangular pattern and a T shaped open sided channel.

Referring particularly to FIGURE 13 there is illustrated a four membered guide indicated generally at 104 and having a plus shaped open sided channel which is occupied by plus shaped joint forming structure 106. Guide members 108, 110, 112 and 114 have straight sided configurations. Upper fin 116 of joint structure 106 is in contact with strip straightener guides 118 and 120, respectively.

The location of guide 34 on slip form 10 may be varied from the location illustrated in FIGURE 1 if desired. The guides 122 and 124, as shown in broken lines in FIGURE 1, are illustrative of two additional locations for the guide.

The strip straightener guides may take the form of an upwardly directed tip portion 126 of the upper guide members, as illustrated in broken lines in FIGURE 2.

In operation uncured concrete 18 is supplied to hopper 14 and slip form 10 is propelled forwardly in the direction of the arrow over base 12 so as to deposit a layer of concrete on base 12. Seal and fracturing strip material is supplied to guide 34 from reels 24 and 26. Guide block 80 and notched guide roller 82 align and orient joint forming structure 84 so that it enters open sided channel 42 with the proper orientation. Joint forming structure 84 is slidably received in open sided channel 42 of guide 34. The lower portion of guide 34 is immersed beneath the upper surface 20 of the uncured concrete mass. The rate at which joint forming structure 84 is supplied to guide 34 is synchronized with the forward motion of slip form 10. Guide 34 is vibrated as it is moved forward through the uncured concrete. Preferably the vibration is applied so as to impart reciprocal motion to the guide in the vertical plane. The vibration causes the concrete to consolidate about the joint forming structure and as the joint forming structure leaves the trailing or rear end of the guide 34 the vibration of strip straightener guides 72 and 74 sets the upper edge 88 of fracturing strip 30 up vertically as illustrated particularly in FIGURE 9. Press plate 22 rides over the upper surface 20 of the concrete slab and smooths out any defects which may appear in upper surface 20.

In general joints are prepared in concrete slabs in both the longitudinal and transverse directions so as to form a grid pattern. In general the longitudinal joint forming structures are inserted first and then the transverse structures are inserted so that they pass through the fracturing strip above the seal of the first joint forming structure. If desired, when the inserting device 32 is employed in laying transverse joints a cutting blade may be positioned forwardly of guide 34 for the purpose of cutting the fracturing strip of the longitudinal joint.

Occasionally it may be desirable to insert the joint forming structure 84 in a plastic mass with its position inverted from that shown in FIGURE 11. In this instance the upper edge 88 would be the bottom most part of the joint forming structure. One convenient means of accomplishing this inverted insertion comprises inserting the fracturing strip by means of a blade such as illustrated in U.S. Patent No. 3,269,282 patented Aug. 30, 1966 to R. L. Beesley et al. The seal is placed in guide 34 in an inverted position and the fracturing strip is placed ahead of the seal by means of the blade illustrated in the above patent and the seal is combined with the fracturing strip below the surface of the plastic mass. In this embodiment the strip straightener guides are on the lower members of the guide.

When preferred the fracturing strip 30 may be combined with the seal 28 in the configuration illustrated in FIGURE 11 below the surface of the concrete mass. This is accomplished by use of the blade illustrated in U.S. Patent No. 3,268,282 to insert in the fracturing strip. The blade is inserted through first open side 44 into groove 86 where it deposits fracturing strip 30.

The self cleaning and good concrete consolidation obtained by use of the open sided guide may be obtained using a guide which contains no arcuate portion 40. A straight guide which is entirely embedded beneath the surface of a plastic mass and which is supplied with joint forming structure through a suitable conduit exhibits the excellent non-jamming and consolidation features of this invention. A wide variety of cross-sectional configuration may be employed for the individual guide members. In addition to the round and square configurations illustrated in FIGURES 12 and 13 angular, triangular, elliptical, and other cross-sectional shapes may be employed if desired.

Other means in addition to the fingers illustrated particularly in FIGURES 6 and 7 may be employed to define the sinuous path over the arcuate portion of the guide, for example, continuous plates having corrugated cross sections may be positioned on opposite guide members in place of the fingers with their corrugations spaced apart in interlocking relationship so as to define therebetween a sinuous path of constant width throughout the arcuate portion of the guide. The fingers have the advantage that as the width of the fracturing strip increases its upper edge is required to travel a distance greater around the fingers thus automatically maintaining the tension constant across the width of the fracturing strip without regard to its width. The angle of inclination of the fingers over the first open side 44 determines the length of the path through which the upper edge of the fracturing strip will have to travel. Determination of this angle of inclination may be made mathematically to arrive at the proper path length or it may be determined empirically by cut and try methods.

Preferably the individual guide members are free to vibrate independently of one another for better cleaning action and consolidation of concrete around that portion or side of the insert which is adjacent the vibrating guide member.

The guide members may be arranged in any configuration so as to define an open sided channel having the desired configuration for any joint forming structure.

When the arcuate portion of the guide is not a smooth curve it may be necessary to set the fingers at different angles of inclinations over the first open side at different points along the irregular curve.

What has been described are preferred embodiments in which changes and modifications may be made without departing from the spirit and scope of the accompanying claims.

What is claimed is:

1. An apparatus for inserting a joint forming structure in a plastic mass which comprises:
a guide having a plurality of elongated guide members extending, spaced apart from and independently of one another to define therebetween an elongated open sided channel, said guide having an arcuate portion, means attached to said guide for vibrating said guide, and means positioned adjacent said guide for supplying a flexible joint forming structure to said channel, at least a portion of said guide being adapted to be immersed in and moved through said plastic mass.

2. The apparatus of claim 1 including four elongated independent guide members spaced apart in a generally rectangular pattern, sail channel having a generally plus shaped cross section.

3. The apparatus of claim 1 wherein said guide members are rigidly supported at one end and are unsupported throughout the rest of their length.

4. The apparatus of claim 1 including straightener guides extending outwardly along opposite sides of said channel only from guide members positioned on the concave side of said arcuate portion, said straightener guides being adapted to contact said flexible joint forming structure as it leaves said channel.

5. The apparatus of claim 1 including two guide members positioned on the concave side of said arcuate portion with the first of said two members being on one edge of said guide and the second of said two members being on the other edge of said guide, one open side of said channel being defined between said two members, a plurality of fingers extending upwardly from the concave arcuate portion of each of the said two members, the fingers on said first member being inclined toward the fingers on said second member, said fingers being interspaced so as to define therebetween a sinuous open path over said one open side.

6. An apparatus for inserting a joint forming structure in a plastic mass which comprises:
a guide having a plurality of independent elongated guide members and spaced apart from each other to define therebetween an elongated open sided channel, means on said guide for attaching said guide to vibrating means, means positioned adjacent said channel for aligning and orienting flexible joint forming structure before said structure enters said channel, and said guide including means for mounting said guide on a machine for carrying said guide.

7. An apparatus for inserting a joint forming structure in a plastic mass which comprises:
a guide having a plurality of elongated guide members extending parallel to and spaced apart from each other to define therebetween an elongated open sided channel, said guide having an arcuate portion, two of said guide members being positioned on a concave side of said arcuate portion, the space between said two members defining one open side of said channel, means on said two members defining a sinuous path, said path extending along and above said one open side at said arcuate portion, means attached to said guide for vibrating said guide, and means positioned adjacent said guide for supplying a flexible joint forming structure to said channel, at least a portion of said guide being adapted to be immsered in and moved through said plastic mass.

8. A method of inserting a joint forming structure in a plastic mass which comprises:
positioning the lower edge of an elongated, supple fracturing strip in an upwardly opening groove between the edges of an elongated, supple, seal to form said structure;
guiding said structure slidably through an elongated open sided channel along a path from a first location above the upper surface of said mass to a second location below and generally parallel to said upper surface, said channel being defined by a guide means, said channel having an arcuate portion, said strip being positioned so that the upper edge of said strip extends through one open side of said channel on a concave side of said arcuate portion;

guiding said upper edge slidably along a sinuous path above said one open side as said structure passes slidably through said arcuate portion, whereby said upper and lower edges travel the same distance through said arcuate portion;

imparting vibration to said guide means; and moving said guide means through said mass to deposit said structure in said mass.

9. The apparatus of claim 1 wherein the ends of the guide members positioned on the concave side of said guide include upwardly directed tip portions.

10. The apparatus of claim 6 wherein said guide is mounted on and is adapted to move with a slip form.

References Cited

UNITED STATES PATENTS

| 1,946,972 | 2/1934 | Heltzel | 94—45 |
| 3,194,130 | 7/1965 | Guntert | 94—45 |
| 3,274,906 | 9/1966 | Worson | 94—39 |
| 3,343,470 | 9/1967 | Atkinson | 94—51 |

NILE C. BYERS, JR., Primary Examiner

U.S. Cl. X.R.

94—51